United States Patent [19]

Takefman

[11] Patent Number: 5,835,036
[45] Date of Patent: Nov. 10, 1998

[54] METHOD OF ENCODING DATA FOR TRANSMISSION

[75] Inventor: Michael L. Takefman, Nepean, Canada

[73] Assignee: Cisco Systems Co., Ontario, Canada

[21] Appl. No.: 854,639

[22] Filed: May 12, 1997

[51] Int. Cl.⁶ .................................................. H03M 7/30
[52] U.S. Cl. ........................... 341/95; 341/87; 370/509
[58] Field of Search .................................. 341/87, 96, 95, 341/67, 59, 60, 50; 370/509, 522, 465

[56] References Cited

U.S. PATENT DOCUMENTS

| | | | |
|---|---|---|---|
| 4,697,167 | 9/1987 | O'keeffe et al. ............................ | 341/59 |
| 4,719,514 | 1/1988 | Kurahayashi et al. ................... | 358/261 |
| 5,444,445 | 8/1995 | Chu ............................................ | 341/87 |
| 5,483,556 | 1/1996 | Pillan et al. .............................. | 375/340 |
| 5,504,929 | 4/1996 | Blair et al. ................................ | 395/885 |
| 5,600,316 | 2/1997 | Moll .......................................... | 341/87 |
| 5,623,477 | 4/1997 | Shimada et al. ....................... | 369/275.3 |
| 5,627,533 | 5/1997 | Clark ......................................... | 341/51 |
| 5,673,265 | 9/1997 | Gupta et al. ............................. | 370/432 |
| 5,699,062 | 12/1997 | Widmer ................................... | 341/58 |

Primary Examiner—Howard L. Williams
Assistant Examiner—Pegux JeanPierre
Attorney, Agent, or Firm—Cesari and McKenna, LLP

[57] ABSTRACT

A method of reducing a number of bits required to transmit a digital signal using a PPP protocol is disclosed. The PPP protocol uses a predetermined byte for signalling. When that byte occurs, the following byte indicates signalling or alternatively, indicates a data byte having a value of the signalling byte. A value in the signalling byte is used to indicate a data byte, and other values are encoded to represent two or more signalling bytes within a predetermined spacing. Due to the look-ahead requirements, a time lag is introduced.

17 Claims, 5 Drawing Sheets

METHOD OF ENCODING DATA FOR TRANSMISSION

FIELD OF THE INVENTION

This invention relates generally to computer network communications. More particularly this invention relates to a method of encoding a data field for transmission.

BACKGROUND OF THE INVENTION

The internet is one of the fastest growing and ubiquitous modes of communication. Many companies have internet servers prepared for delivery of information, goods and services. At first, the information found on the internet or more specifically, the world-wide-web (WWW) was technological information, but today, more and more businesses and individuals express themselves on the world-wide-web.

Generally, the slowest link in a data communication system is a connection from a remote site via a public network to an information server. Even with current advances in data transmission speeds and data compression algorithms, data throughput continues to be a common problem in 'surfing' the web and in communications, in general. Often, end-users connect to an internet service provider (ISP) using a modem. The connection is maintained through one of several protocols. One such protocol is point-to-point protocol PPP. PPP is a byte synchronous data link layer. Data is always transmitted in complete bytes and in a synchronous fashion. This makes PPP well suited for use with personal computer technologies.

Unfortunately, in order to transmit framed information, the PPP protocol reserves some bytes, for example as frame delimiters. As such, those bytes have special functions wherever located and an actual occurrence of those bytes within a data stream is replaced with an escape byte followed by a byte indicative of that byte within the data—a process known as encoding.

Reducing the number of bytes required to encode data for transmission to an ISP, allows increased data throughput to an end user. Preferably, the number of bytes is reduced absent expensive hardware and software changes.

OBJECT OF THE INVENTION

Thus, in an attempt to overcome these and other limitations of known prior art devices and methods, it is an object of this invention to provide a method for transmitting encoded information of a byte based protocol, such as PPP, using fewer bytes than are used in current transmissions.

It is a further object of this invention to provide a method for transmitting encoded information according to the PPP protocol but requiring reduced bandwidth.

SUMMARY OF THE INVENTION

In accordance with the invention, there is provided a method of encoding a data field for transmission wherein a transmission comprises at least a predetermined data byte for replacement by an escape byte followed by an encoded byte. The method comprises the steps of:

locating a first byte within the data field, the first byte comprising one of a predetermined group of data bytes;

locating a second byte within the data field, the second byte at a different location within the data field and comprising one of the predetermined group of data bytes;

when the first byte does not comprise an escape byte, replacing the located first byte with an escape byte;

inserting an encoded byte following the escape byte, the encoded byte comprising an indication of a data type of the first byte, a data type of the second byte, and a spacing between the first and second bytes; and, removing the second byte from the data field.

In accordance with the invention, there is provided a method of encoding a data field for transmission wherein a transmission comprises at least a predetermined data byte replaced by an escape byte followed by an encoded byte indicative of the predetermined data byte. The method comprises the steps of:

locating first bytes within the data field, the first bytes comprising an escape byte and an encoded byte following the escape byte;

locating second bytes within the data field, the second bytes at different locations within the data field from the first bytes and comprising an escape byte and an encoded byte following the escape byte;

replacing the located encoded byte from the first bytes with at least an encoded byte comprising an indication of a data type of the first bytes, a data type of the second bytes, and a spacing between the first and second bytes; and, removing the second bytes from the data field.

In an embodiment, the method further comprises the steps of:

locating third bytes within the data field, the third bytes at different locations within the data field from the first bytes and the second bytes and comprising an escape byte and an encoded byte following the escape byte, and removing the third bytes from the data field; and, wherein the at least an encoded byte comprises a data type of the third bytes and a spacing between the first bytes and the third bytes.

An advantage of the present invention is reduced transmission throughput using framed transmission.

A further advantage of the present invention is low cost implementation of improved data throughput when using framed data transmission.

BRIEF DESCRIPTION OF THE DRAWINGS

Exemplary embodiments of the invention will now be described in conjunction with the following drawings, in which.

DETAILED DESCRIPTION OF THE INVENTION

In communication systems, a plurality of protocols are often used simultaneously in order to manage different layers within a communications network. For example, a data transfer protocol is often accompanied by a compression protocol, a data verification protocol, and a low level communications protocol to manage the communication medium. The invention is described with respect to a PPP communication protocol but is not limited thereto. The method of this invention is applicable to other byte synchronous protocols having a small finite number of bytes requiring encoding.

One common protocol used in data communication is PPP. PPP is a byte synchronous data link layer protocol; within the PPP protocol data is transmitted in groups of bits termed bytes; such groups are commonly 8 bits but bytes may have 9 bits or another number of bits. In the embodiments described herein all bytes are 8 bits. Bits and bytes are well known in arts relating to computers and are therefore not discussed further.

Figure 1:
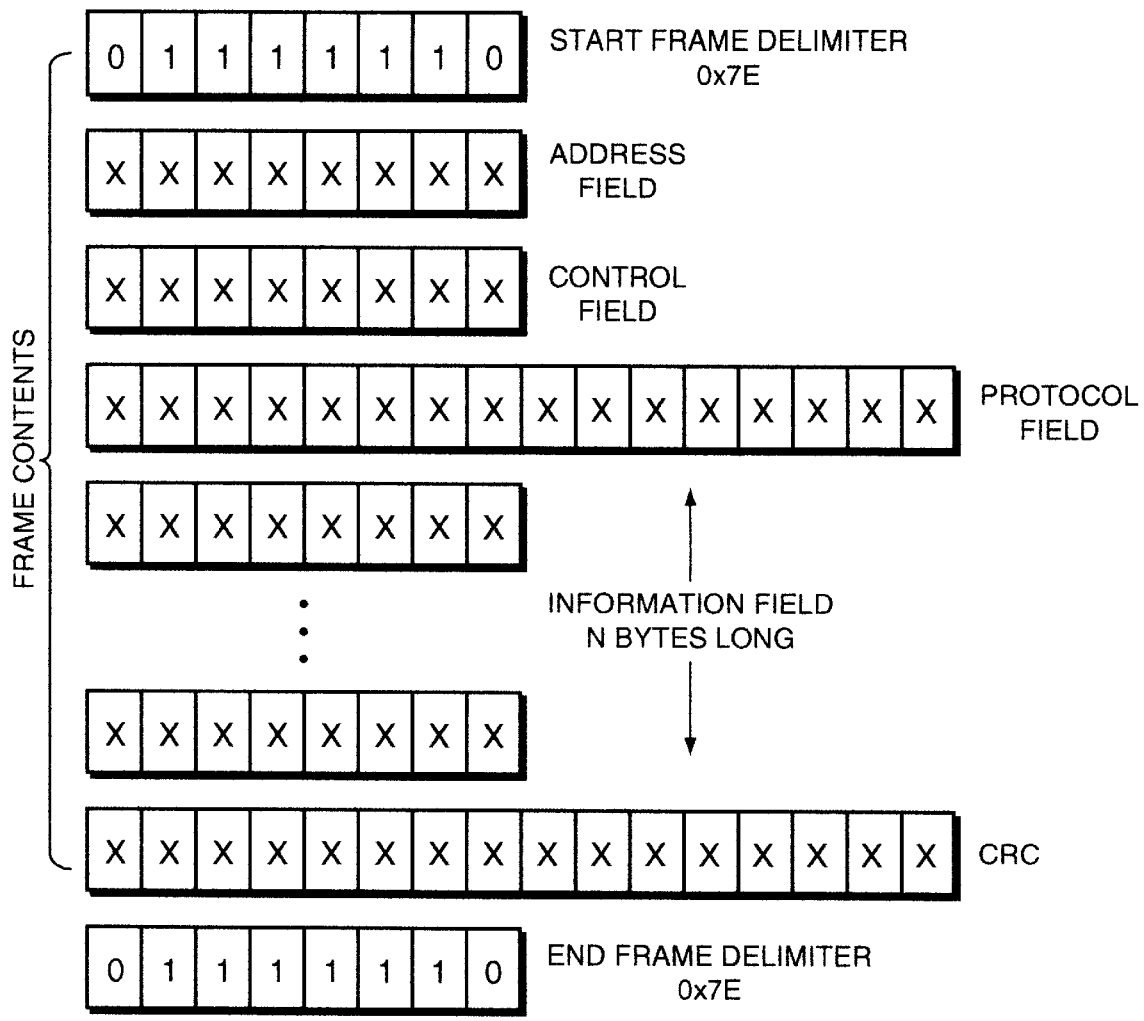
FIG. 1 is a simplified diagram of a PPP Frame data structure.

When using PPP, data is encapsulated into a PPP frame and then transmitted over a physical layer or communication path. A typical PPP frame is shown in FIG. 1. The frame comprises: Start of Frame Delimiter, frame content, and End of Frame Delimiter. The frame content comprises Address Field, Control Field, Protocol Field, Information Field, and CRC Field. Each field comprises a number of bytes. With the exception of the Information Field, each field has a fixed size. The Information Field is a variable size field containing the actual data for transmission. Unfortunately, a frame delimiter can not be present within the frame content or it signals an end of frame.

A common method of avoiding this problem is used in the PPP protocol. When a data byte corresponding to the delimiter is within the frame content, it is replaced with two data bytes. A first data byte—an escape byte—indicates a byte that is not data, and a second byte indicates the data in the form of the delimiter byte or the escape byte. It is evident to those of skill in the art that the escape byte is also a special byte and must be inserted within the frame content as a two-byte sequence.

A prior art data encoding for a data field in the form of frame content of a PPP frame is described below. The delimiter, as is currently used with PPP, is 0x7E and the escape byte is 0x7D. The byte following the escape byte is a 0x5E to represent a 0x7E and a 0x5D to represent a 0x7D. A typical frame content comprises a string of bytes. An 8 byte frame content, 0x7D 0x7D 0x10 0x20 0x7E 0x30 0x7E 0x7E, is used for this example. The frame content may comprise any number of bytes. A quick review of the frame content above indicates that several delimiters and escape bytes are contained therein. The frame content is encoded for transmission within a PPP frame, as follows:

0x7D 0x5D 0x7D 0x5D 0x10 0x20 0x7D 0x5E 0x30 0x7D 0x5E 0x7D 0x5E.

The encoded frame content comprises 13 bytes or a 62.5% increase in data.

Figure 2:
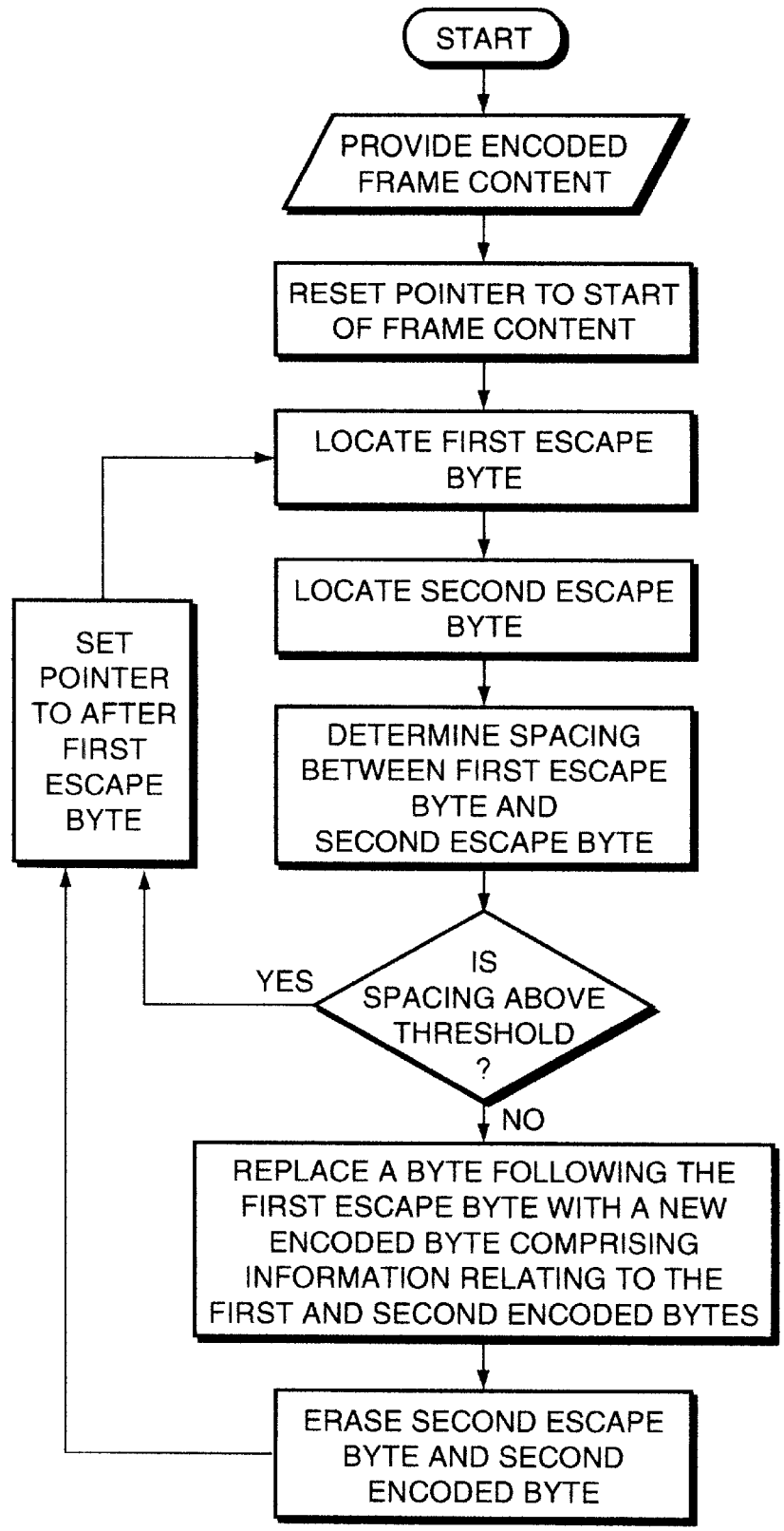
FIG. 2 is a simplified flow diagram of a method according to the invention for encoding two escape bytes and subsequent encoded values into a single escape byte and encoded value.

Referring to FIG. 2, a simplified flow diagram of a method of reducing the number of bytes in an encoded frame content for use with PPP is shown. The method is performed on the encoded frame content thereby allowing for use of the method with existing PPP communications systems.

The encoded frame content is analysed for escape bytes. When 2 or more escape bytes are detected, a spacing therebetween is established. When the spacing is below a predetermined threshold, the first escape byte is left in place, the byte following the first escape byte is altered. A bit is used to distinguish from prior art encoding. As 01111110 represents a value of 0x7E and a value of 0x7D is represented by 01111101, bits 0 (high order bit) through 5 have a same value. Altering the value of any one of bits 0–5 is indicative of the present encoding scheme. In an embodiment, bit 0 is altered to a value of 1. Another bit, bit 1, is used to distinguish between encoding of a delimiter byte or of an escape byte. When the byte following the escape byte is 0x5E, a 1 is used; when the byte following the escape byte is 0x5D, a 0 is used. Alternatively, 0 is used to correspond with a value of 0x5E and 1 is used to correspond with a value of 0x5D. A second bit, bit 2, is used in an analogous fashion and corresponding to the byte following the second escape byte. To this point 3 bits have been used. The remaining 5 bits are then used to determine a spacing to the next escape byte. Once encoding of the byte is complete, the second escape byte and the encoded byte following the second escape byte are removed from the frame content, reducing the byte count for the encoding by 2 bytes. To this point the encoded frame content appears as follows:

0x7D 0x80 0x10 0x20 0x7D 0x5E 0x30 0x7D 0x5E 0x7D 0x5E.

where the second Byte 0x80 is
1 (not conventional PPP encoding)
0 (0x7D)
0 (0x7D)
00000 (the next occurrence is the next byte).
The resulting frame content is shortened by 2 bytes. The re-encoding steps are then applied to the remainder of the frame content. 2 more escape bytes are detected. The first escape byte is shown above in bold. The second escape byte, shown underlined, occurs within 32 bytes of the escape byte allowing for application of the present method. The 8 bit byte that will follow the first escape byte comprises
1 (not conventional PPP encoding)
1 (0x7E)
1 (0x7E)
00001 (the next occurrence is after the next byte).
To this point the encoded frame content appears as follows:

0x7D 0x80 0x10 0x20 0x7D 0xE1 0x30 0x7D 0x5E.

A search for subsequent escape bytes locates only one final escape byte. The final escape byte, shown in bold, need not be re-encoded because there is no savings of bandwidth.

Optionally, the byte is re-encoded according to the invention. When re-encoding is employed, an extra bit is necessary to indicate the encoding of a single byte or two bytes.

The resulting 9 byte stream is significantly shorter than the frame content encoded according to the prior art.

Figure 3:
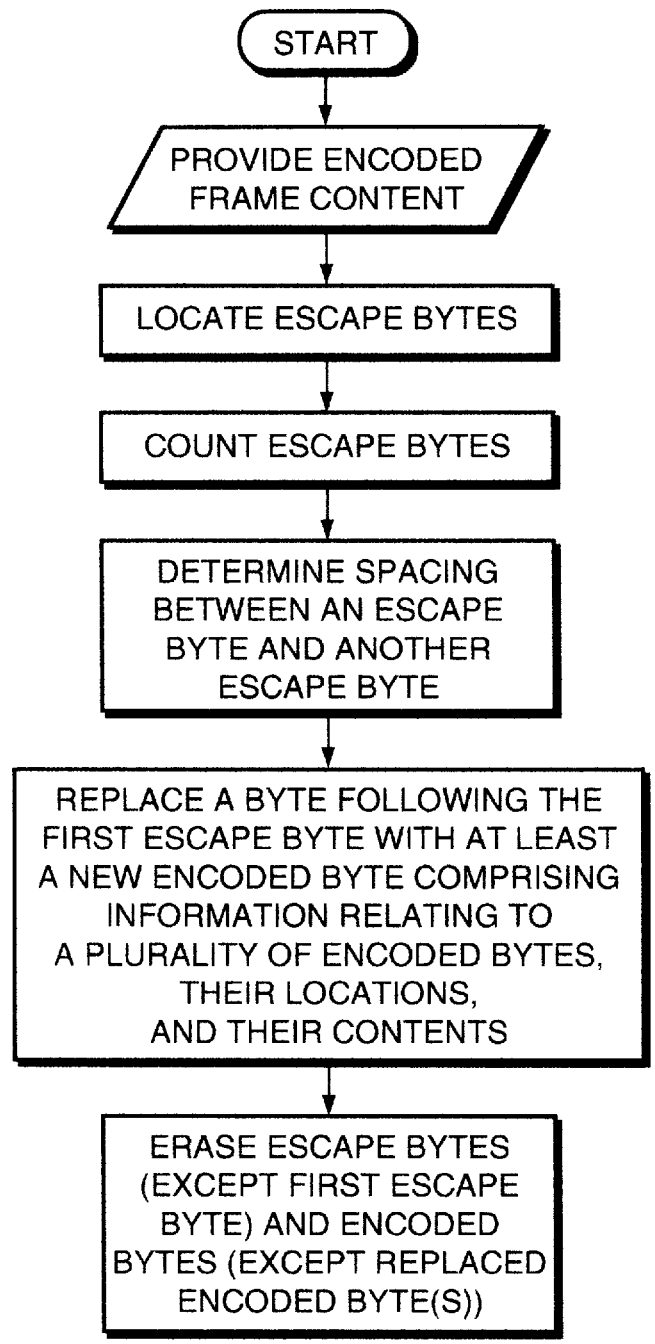
FIG. 3 is a simplified flow diagram of a method according to the invention for encoding a plurality of escape bytes and subsequent encoded values into a single escape byte and a number of subsequent bytes.

Referring to FIG. 3, a simplified flow diagram of a further method according to the invention is shown. For frame contents having a large number of escape bytes, such a method provides a high degree of compression. Referring again to the encoded frame content presented above:

0x7D 0x5D 0x7D 0x5D 0x10 0x20 0x7D 0x5E 0x30 0x7D 0x5E 0x7D 0x5E, a number of escape bytes, shown italicised, are located. Preferably, all the escape bytes are located. The bytes are analysed to determine a number of bytes, a type—escape or delimiter—of byte, and a spacing between bytes. The first escape byte remains unchanged. The byte following the first escape byte is re-encoded according to the method shown in FIG. 3. The first bit is set to 1 to distinguish the byte from prior art encoding so as to make the method of FIG. 3 compatible with receiving PPP encoded transmissions according to the prior art. The next 2 bits are used for transmitting an escape byte count. The value 00 corresponds to 2 escape bytes and 11 corresponds to 5 escape bytes. The remaining bits within the byte correspond to a type of encoded byte. As in the method of FIG. 2, a 0 corresponds to an encoded value of 0x5D and 1 corresponds to an encoded value of 0x5E. A third byte is inserted after the byte following the first escape byte to carry spacing information. The spacing is divided into 4 bit values corresponding to spacings of 0–14. Alternatively, higher numbers of bits are used for determining spacing. When spacing between encoded values is determined, the escape byte and the encoded value are removed from the frame content.

The frame content shown above is encoded as follows:

0x7D 0xE7 0x02 0x10 0x10 0x20 0x30, and is shorter than the original un-encoded frame content. The byte 0xE7 is determined as follows:

1 (distinguished from prior art encoding scheme)
11 (5 escape bytes are located)
0 (0x7D)
0 (0x7D)
1 (0x7E)
1 (0x7E)
1 (0x7E)

The byte 0x02 is determined as follows:
0000 (the next byte is an escape byte)
0010 (two bytes after the escape byte is an escape byte)

The byte 0x10 is determined as follows:
0001 (one byte after the escape byte is another escape byte)
0000 (a second escape byte follows the previous).

According to the method of FIG. 3, when only 4 escape bytes are located, there is one unused bit within the first byte. A further 8 bits in another byte results in 9 bits. Therefore, when only 4 escape bytes are located, a 3-bit value is used to encode spacing. Alternatively, a further byte is required and 5-bit values are used resulting in 2 unused bits. Further alternatively, a four bit value is used. When 3 bytes are escape bytes, the two unused bits in the first byte allow for 5-bit values representing spacing, should that be desirable. When 2 bytes are found, 3 bits remain for spacing information. Alternatively, 11 bits are used and the spacing is up to 2048 bytes apart. When 1 escape byte is detected, encoding is performed according to the prior art.

In the method shown in FIG. 3, it is important that the encoded spacing not result in a value of 0x7E or 0x7D. In order to avoid this situation, a spacing of 0–14 is indicated by the 4-bit values associated with spacing and a 15$^{th}$ value, 0x7X, is unavailable. Several other solutions are possible, such as providing spacing values from 0–7 bytes for the high order 4 bits to set the highest order bit to 1, etc.

Figure 4:
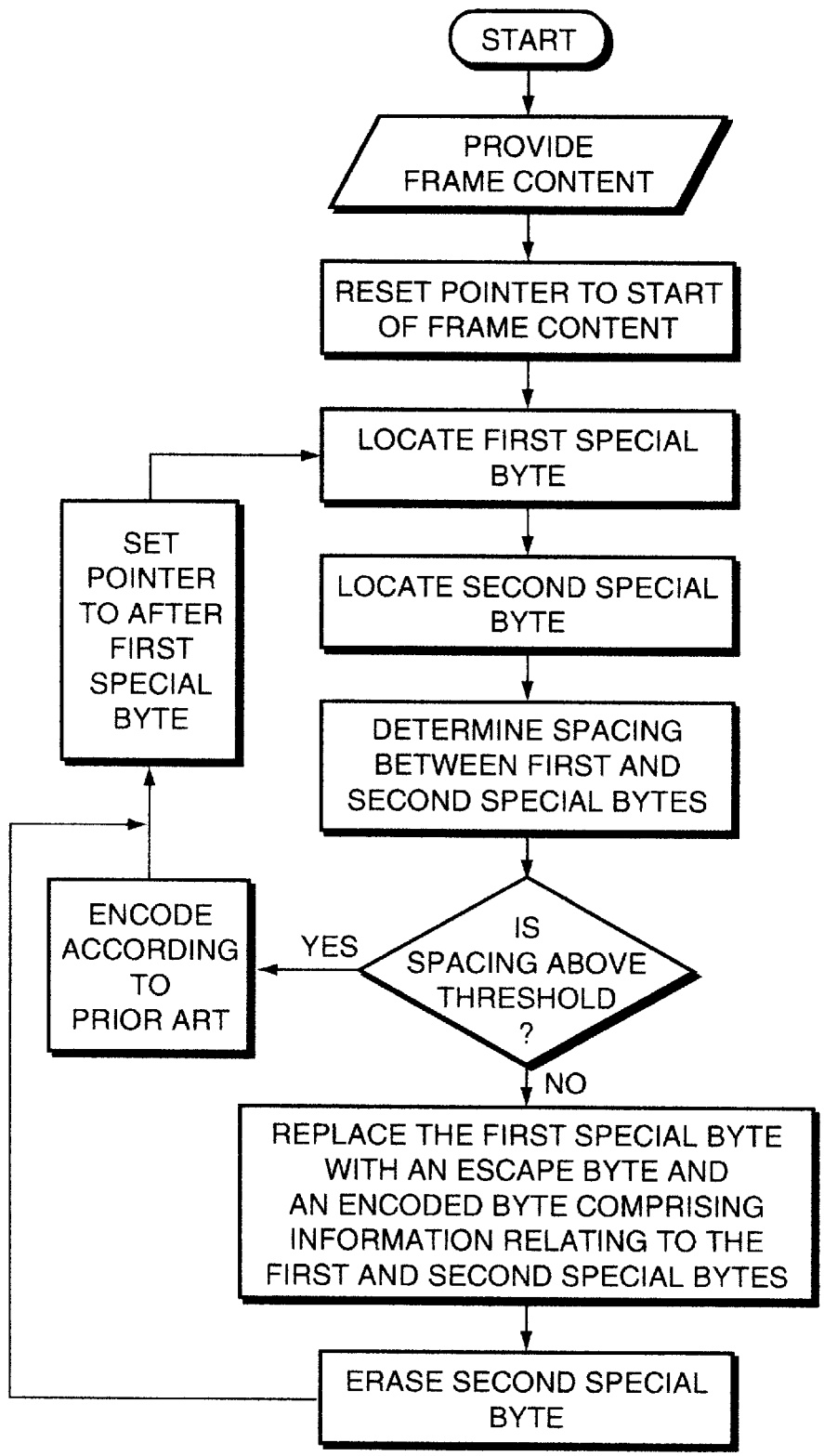
FIG. 4 is a simplified flow diagram of a method according to the invention for encoding an un-encoded frame content using a single escape byte and encoded value to encode two bytes requiring encoding.

Referring to FIG. 4, a simplified flow diagram of a method of reducing the number of bytes necessary to encode a frame content for use with PPP is shown. The method is performed on the frame content during encoding and is substantially similar to the method shown in FIG. 2.

The un-encoded frame content is analysed for bytes requiring encoding. When 2 or more such bytes are detected, a spacing therebetween is established. When the spacing is below a predetermined threshold, the first byte is replaced with two bytes—an escape byte and another byte. The other byte is encoded immediately following the escape byte and contains predetermined information. A bit is used to distinguish from prior art encoding. Using a bit to identify encoding according to the present invention, allows a single system according to the invention to decode received signals encoded according to the invention and encoded according to the prior art. As a value of 0x7E is represented by 001111110 and a value of 0x7D is represented by 01111101 bits 0 through 5 have a same value. Altering the value of any one of bits 0–5 is indicative of the present encoding scheme. In the present embodiment, bit 0 (high order bit) is altered to a value of 1. Another bit, in this embodiment bit 1, is encoded to distinguish between encoding of a delimiter byte or of an escape byte. A bit, bit 1, is encoded with a value indicative of encoding a delimiter or an escape byte. When the byte for encoding is a 0x7E, a 1 is used; When the byte is 0x7D, a 0 is used. Alternatively, 0 is used to correspond with a value of 0x7E and 1 is used to correspond with a value of 0x7D. A second bit, bit 2, is then encoded in an analogous fashion and corresponding to the byte following the next escape byte. To this point 3 bits have been used. The remaining 5 bits are then used to determine a spacing to the byte requiring encoding. Once encoding of the byte is complete, the next byte requiring encoding is removed from the frame content, reducing the byte count for the encoded frame content by 2 bytes over that of the prior art. For the un-encoded frame content:

0x7D 0x7D 0x10 0x20 0x7E 0x30 0x7E 0x7E, encoding, to this point, results in the following partially encoded frame content:

0x7D 0x80 0x10 0x20 0x7E 0x30 0x7E 0x7E.

where the second Byte 0x80 is
1 (not conventional PPP encoding)
0 (0x7D)
0 (0x7D)
00000 (the next occurrence is the next byte).

The resulting frame content is a same length as the original frame content but is now devoid of certain byte values. The method proceeds to the next predetermined byte requiring encoding and shown above in bold. A second byte, shown underlined, occurs within 32 bytes of the byte shown in bold allowing for repeated application of the present method. The repeated application of the method results in a partially encoded frame content as follows:

0x7D 0x80 0x10 0x20 0x7D 0xE1 0x30 0x7E.

The final byte requiring encoding, shown in bold, is encoded alone according to the prior art. Encoding according to the present method requires 2 bytes which is a same number of bytes as required by prior art encoding. The final encoded frame content:

0x7D 0x80 0x10 0x20 0x7D 0xE1 0x30 0x7D 0x5E has one byte more than the un-encoded frame content.

The resulting 9 byte stream is significantly shorter than the encoded frame content according to the prior art. The method of FIG. 4, as described above is well suited to implementation in PPP protocol management systems for replacing existing PPP protocol management systems. The method of FIG. 2 is well suited to applications wherein existing PPP protocol management systems exist and communications throughput is desired.

Figure 5:
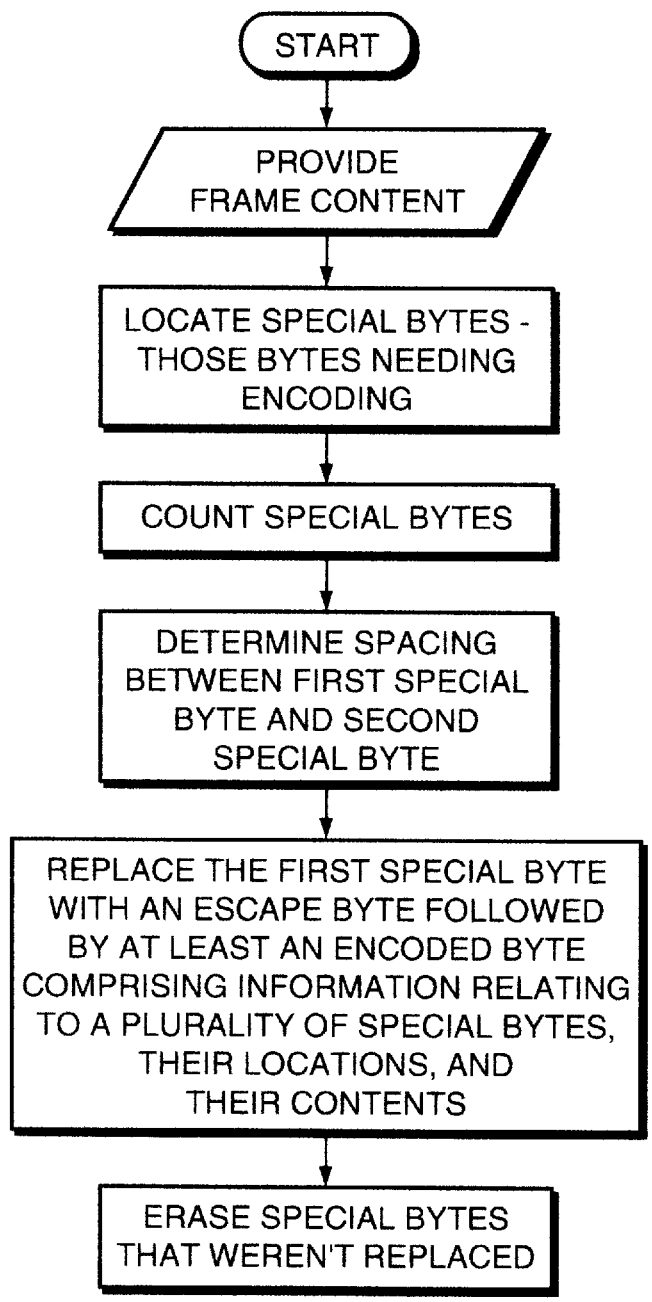
FIG. 5 is a simplified flow diagram of a method according to the invention for encoding a plurality of bytes requiring encoding into a single escape byte and a number of subsequent bytes.

Referring to FIG. 5, a simplified flow diagram of a method of reducing the number of bytes necessary to encode a frame content for use with PPP is shown. The method is performed on the frame content during encoding and is substantially similar to the method shown in FIG. 3. Applicability of such a method, in contrast to applicability of the method of FIG. 3, is analogous to the applicability of the methods of FIGS. 2 and 4.

Referring to the un-encoded frame content presented above,

0x7D 0x7D 0x10 0x20 0x7E 0x30 0x7E 0x7E, a number of bytes requiring encoding and shown in italics are located. Preferably, all the bytes requiring encoding are located. The bytes are analysed to determine a number of bytes, a type of byte—escape (0x7D) or delimiter (0x7E)—, and a spacing between bytes. The first byte is replaced by a plurality of bytes comprising an escape byte and at least a further byte following the escape byte. The first bit of the further byte is set to 1 to distinguish the byte from prior art encoding so as to make the method of FIG. 5 compatible with receiving PPP encoded transmissions according to the prior art. The next 2 bits are encoded with a count of bytes requiring encoding. The value 00 corresponds to 2 bytes and 11 corresponds to 5 bytes. The remaining bits within the byte correspond to a type of byte for each of the located bytes. As in the method of FIG. 3, a 0 corresponds with a value of 0x7D and 1 corresponds with a value of 0x7E. The second further byte inserted after the first further byte carries spacing information. The spacing is divided into 4 bit values corresponding to spacings of 0–14. Alternatively, higher numbers of bits are used for determining spacing. When spacing between each byte requiring encoding is determined, the byte requiring encoding is removed from the frame content.

The un-encoded frame content shown above is encoded as follows:

0x7D 0xE7 0x02 0x10 0x10 0x20 0x30,

An explanation of the derivation of the bytes in this encoded frame content, is presented with reference to FIG. 3.

In the method shown in FIG. 5, as with the method of FIG. 3, it is important that the encoded spacing not result in a value of 0x7E or 0x7D. In order to avoid this situation, a spacing of 0–14 is indicated by the 4-bit values associated with spacing and a 15$^{th}$ value, 0x7X, is unavailable. Several other solutions are possible, such as providing spacing values from 0–15 where the second nibble of the byte does not correspond to a second nibble of a byte requiring encoding and fewer values where this is not the case, etc.

In an alternative embodiment, a number of bytes greater than two require encoding. Scaling of the method of the present invention is limited by the number of bytes requiring encoding. For example, when 0x70 through 0x7F are bytes requiring encoding, the single-bit for distinguishing the byte value is replaced with 4 bits for distinguishing the byte value. The result is unlikely to reduce an encoded byte count. When a number of bytes requiring encoding is 4, two bits are required to identify the bytes. A typical structure for use in such an application is:

1 (distinguishes from un-encoded values)

xx (first encoded byte selected from 4 available encoded bytes)

xx (first encoded byte selected from 4 available encoded bytes)

xxx (a value of 0–7 representing the spacing).

As is evident from the above, the spacing threshold is greatly reduced or the savings are reduced through addition of a further byte. When encoding a higher number of bytes into a single escape byte followed by a number of bytes, the available bits for spacing information is more flexible.

From the foregoing, it is apparent that scaling of the method of the present invention is limited by confusion between encoded bytes and delimiters. For example, when bytes requiring encoding comprise 0x7E and 0x81, no common bits exist between the two values and a further bit is required to ensure that a value of 0x7E and 0x81 does not result from the encoding itself.

In an alternative embodiment, the method is applied to a single type of byte requiring encoding. Only one bit for distinguishing byte types is required. The un-encoded frame content above will again be used for this example.

0x7D 0x7D 0x10 0x20 0x7E 0x30 0x7E 0x7E is analysed to determine bytes of a first type, 0x7D, and shown in italics. Two bytes are found within the threshold spacing, when applying the method of FIG. 4. Similarly for 0x7E the first two occurrences are detected. The resulting encoded sequence appears as:

0x7D 0x80 0x10 0x20 0x7D 0xC1 0x30 0x7D 0x5E.

The value of the encoded bytes requires only a single bit to distinguish between encoding a plurality of 0x7D bytes or a plurality of 0x7E bytes. This leaves 6 bits for encoding spacing related information.

A similar method to that above but analogous to the method of FIGS. 3 and 5 will now be discussed. Here the un-encoded frame content shown above is first analysed for bytes 0x7D. Two are found. The partially encoded frame content that results is 0x7D 0x80 0x10 0x20 0x7E 0x30 0x7E 0x7E, wherein the bits in the encoded byte 0x80 are determined as follows:

1 (distinguishes encoded byte from prior art encoded bytes), 0 (byte type 0x7D), 00 (count is 2), and 0000 (spacing information).

Then, the frame content is analysed for occurrences of 0x7E. The encoded frame content that results is 0x7D 0x80 0x10 0x20 0x7D 0xD1 0x00 0x30 0x7E 0x7E, wherein the bytes 0xD1 0x00 are determined as follows:

1 (distinguishes encoded byte from prior art encoded bytes), 1 (byte type 0×7E), 01 (count is 3), 0001 (spacing information for first byte), 0000 (prevents byte from being 0×7E), and, 0000 (spacing indicating next byte required encoding).

Such a method is applicable even when a number of bytes in excess of 4 require encoding as the bits for distinguishing byte type only occur once in the encoded information.

Numerous other embodiments may be envisaged without departing from the spirit and scope of the invention.

What is claimed is:

1. A method of encoding a data field for transmission wherein a transmission comprises at least a predetermined data byte for replacement by an escape byte followed by an encoded byte, the method comprising the steps of:

locating a first byte within the data field, the first byte comprising one of a predetermined group of data bytes;

locating a second byte within the data field, the second byte at a different location within the data field and comprising one of the predetermined group of data bytes;

when the first byte does not comprise an escape byte, replacing the located first byte with an escape byte;

inserting an encoded byte following the escape byte, the encoded byte comprising an indication of a data type of the first byte, a data type of the second byte, and a spacing between the first and second bytes; and, removing the second byte from the data field.

2. A method of encoding a data field as defined in claim 1 wherein the data field is a frame content within a PPP frame.

3. A method of encoding a data field as defined in claim 1 wherein the encoded byte comprises a bit corresponding to the first byte and a bit corresponding to the second byte.

4. A method of encoding a data field as defined in claim 1 wherein the encoded byte comprises a bit corresponding to both the first byte and to the second byte and wherein the first byte and the second byte are same bytes in different locations within the data field.

5. A method of encoding a data field as defined in claim 1 wherein the encoded byte is different from each one of the predetermined group of data bytes.

6. A method of encoding a data field as defined in claim 1 further comprising the steps of:

locating a third byte within the data field, the third byte comprising one of the predetermined group of data bytes, and removing the third byte from the data field; and, wherein the encoded byte comprises a data type of the third byte and a spacing between the second byte and the third byte.

7. A method of encoding a data field as defined in claim 6 wherein the encoded byte comprises a bit corresponding to the first byte, the second byte, and the third byte and wherein the first byte, the second byte, and the third byte are same bytes in different locations within the data field.

8. A method of encoding a data field as defined in claim 6 wherein the encoded byte comprises a plurality of bytes.

9. A method of encoding a data field as defined in claim 8 wherein each of the plurality of bytes within the encoded byte is different from each one of the predetermined group of data bytes.

10. A method of encoding a data field as defined in claim 8 wherein the spacing between the first and second bytes and between the second and third bytes is encoded using a plurality of bits such that some bit values are unused to ensure that each encoded byte is different from each one of the predetermined group of data bytes.

11. A method of encoding a data field for transmission wherein a transmission comprises at least a predetermined data byte replaced by an escape byte followed by an encoded byte indicative of the predetermined data byte, the method comprising the steps of:

locating first bytes within the data field, the first bytes comprising an escape byte and an encoded byte following the escape byte;

locating second bytes within the data field, the second bytes at different locations within the data field from the first bytes and comprising an escape byte and an encoded byte following the escape byte;

replacing the located encoded byte from the first bytes with at least an encoded byte comprising an indication of a data type of the first bytes, a data type of the second bytes, and a spacing between the first and second bytes; and, removing the second bytes from the data field.

12. A method of encoding a data field as defined in claim 11 wherein the data field is a frame content within a PPP frame.

13. A method of encoding a data field as defined in claim 11 wherein the at least an encoded byte comprises a bit corresponding to the first byte and a bit corresponding to the second byte.

14. A method of encoding a data field as defined in claim 11 wherein the at least an encoded byte comprises a bit corresponding to both the first byte and to the second byte and wherein the first byte and the second byte are same bytes in different locations within the data field.

15. A method of encoding a data field as defined in claim 11 wherein each of the at least an encoded byte is different from each one of the predetermined group of data bytes.

16. A method of encoding a data field as defined in claim 11 further comprising the steps of:

locating third bytes within the data field, the third bytes at different locations within the data field from the first bytes and the second bytes and comprising an escape byte and an encoded byte following the escape byte, and removing the third bytes from the data field; and, wherein the at least an encoded byte comprises a data type of the third bytes and a spacing between the second bytes and the third bytes.

17. A method of encoding a data field as defined in claim 11 further comprising the steps of:

locating third bytes within the data field, the third bytes at different locations within the data field from the first bytes and the second bytes and comprising an escape byte and an encoded byte following the escape byte, and removing the third bytes from the data field; and, wherein the at least an encoded byte comprises a data type of the third bytes and a spacing between the first bytes and the third bytes.

* * * * *